Figure 1:
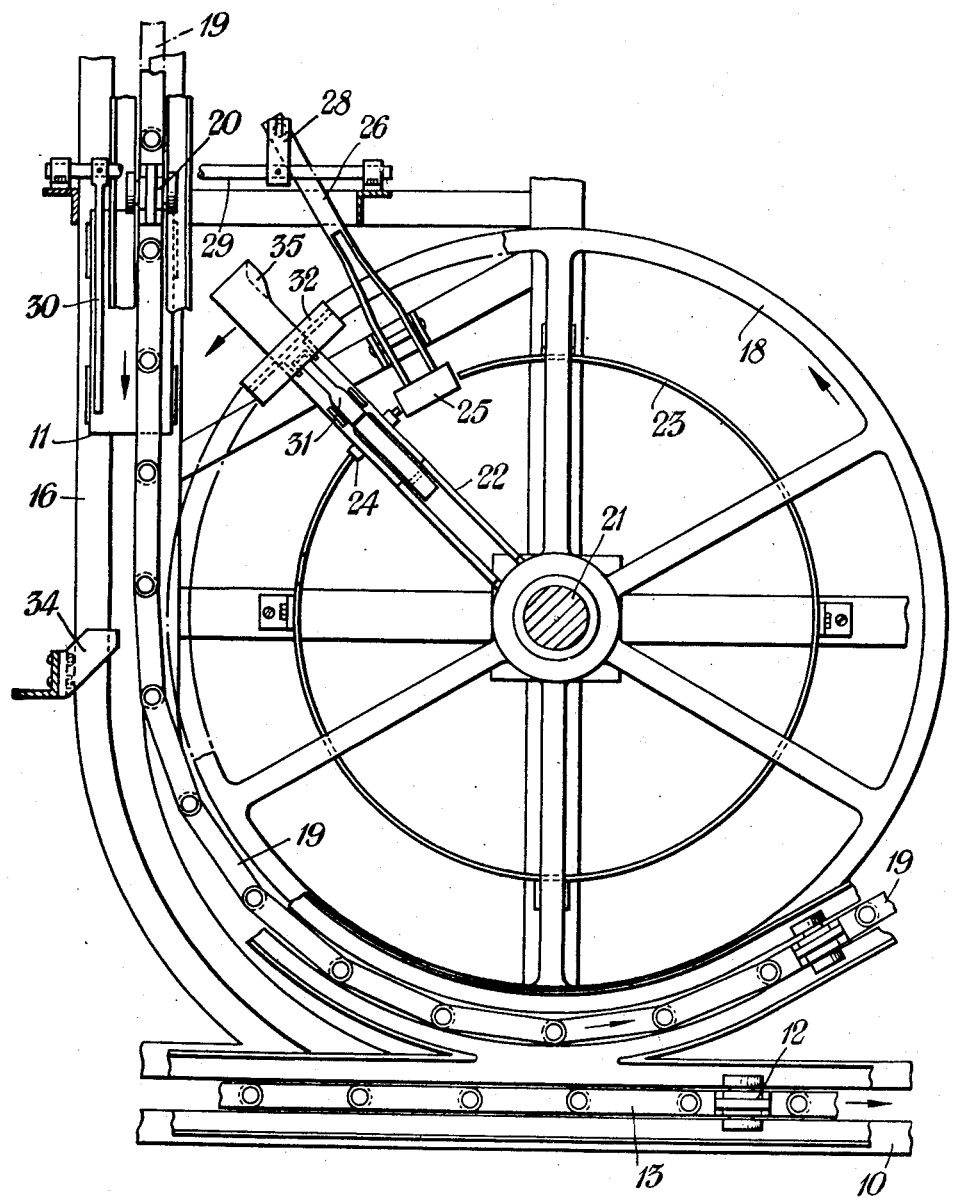

Sept. 14, 1954      R. J. BROOKS      2,688,936
CONVEYER SYSTEM

Filed Aug. 8, 1951      4 Sheets-Sheet 1

INVENTOR
ROBERT JOHN BROOKS
By Haseltine, Lake & Co.
AGENTS

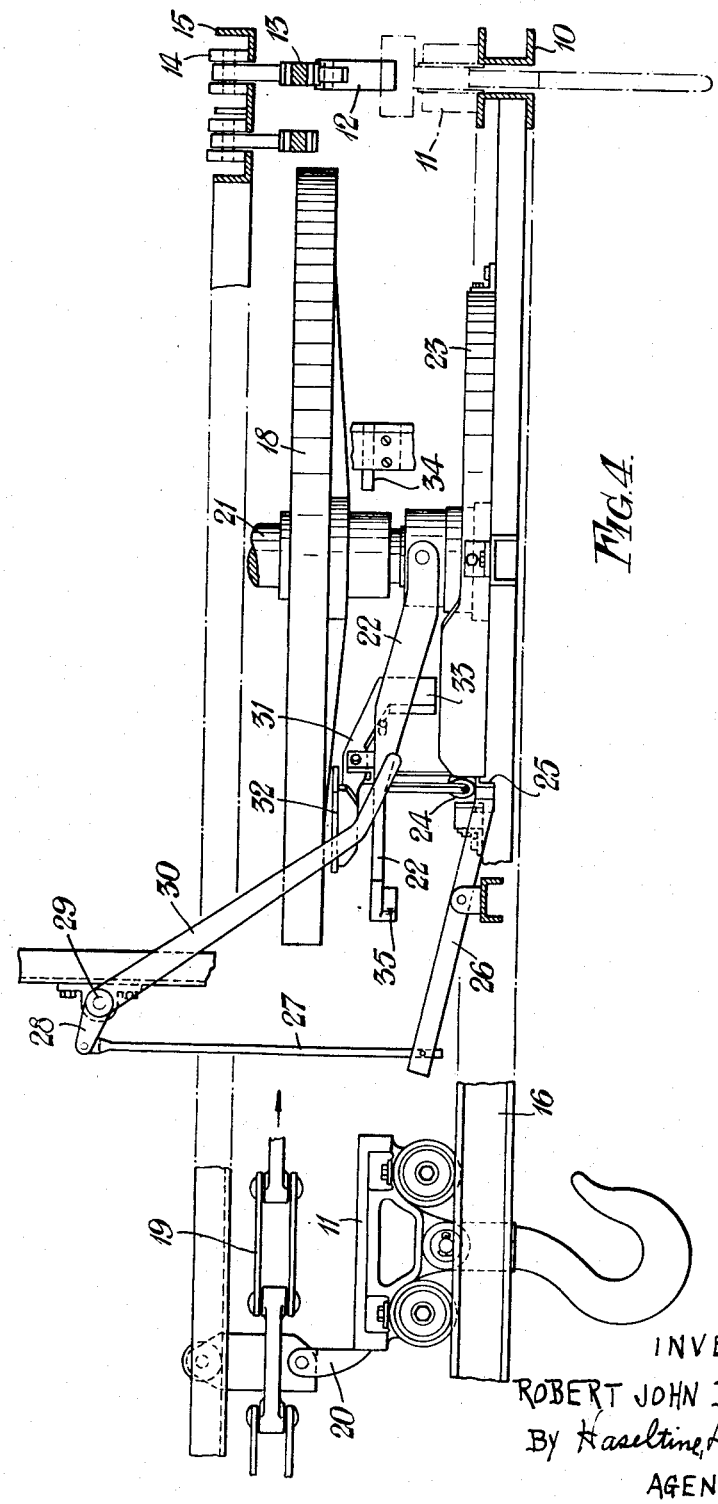

Patented Sept. 14, 1954

2,688,936

UNITED STATES PATENT OFFICE 2,688,936

CONVEYER SYSTEM

Robert John Brooks, Hitchin, England, assignor to Geo. W. King Limited, Hitchin, England, a British company Application August 8, 1951, Serial No. 240,827

Claims priority, application Great Britain August 11, 1950

8 Claims. (Cl. 104—104)

This invention relates to conveyor systems of the type wherein load carrying trolleys are propelled along a track by virtue of the engagement therewith of pusher dogs or driving abutments carried by a driving chain which is itself suspended from trolleys adapted to run on a second track disposed above that on which the load carrying trolleys are caused to run.

It is the chief object of the invention to provide a transfer mechanism whereby a load carrying trolleys may be transferred from a subsidiary or storage conveyor to a main conveyor line.

According to the invention in a conveyor system which includes a main conveyor of the type set forth and one or more subsidiary or branch conveyors of similar type communicating with said main conveyor, means are provided to effect transfer of load carrying trolleys from each branch conveyor to the main conveyor, the arrangement being such that as each trolley approaches the confluence of the conveyors and the pusher dog or driving abutment carried by the driving chain of the branch conveyor passes out of engagement therewith, said means will be operative positively to propel the trolley on to the main conveyor track and into a position such that it will be engaged by a pusher dog or abutment carried by the driving chain of the main conveyor.

Preferably the driving chain of each branch conveyor is caused to pass around a terminal or so-called corner chain wheel which is disposed adjacent the confluence of the main and branch conveyors and an arm is provided which is movable angularly and is adapted to be brought into engagement with each trolley as it is moved along the branch conveyor towards the main conveyor, said arm being so constructed and arranged that, as the driving chain of the branch conveyor passes around the chain wheel and the pusher dog carried thereby is withdrawn from contact with the trolley, said pusher dog will cause an angular movement to be imparted to the arm which is sufficient positively to propel the trolley from the branch to the main conveyor track and into a position whereby it will be engaged by a pusher dog or abutment carried by the driving chain of the main conveyor. The arm is conveniently mounted for angular movement about the axis of rotation of the chain wheel and it is moreover so constructed and arranged as to be capable of an additional pivotal movement about an axis at right-angles to the aforesaid axis.

Figure 2:
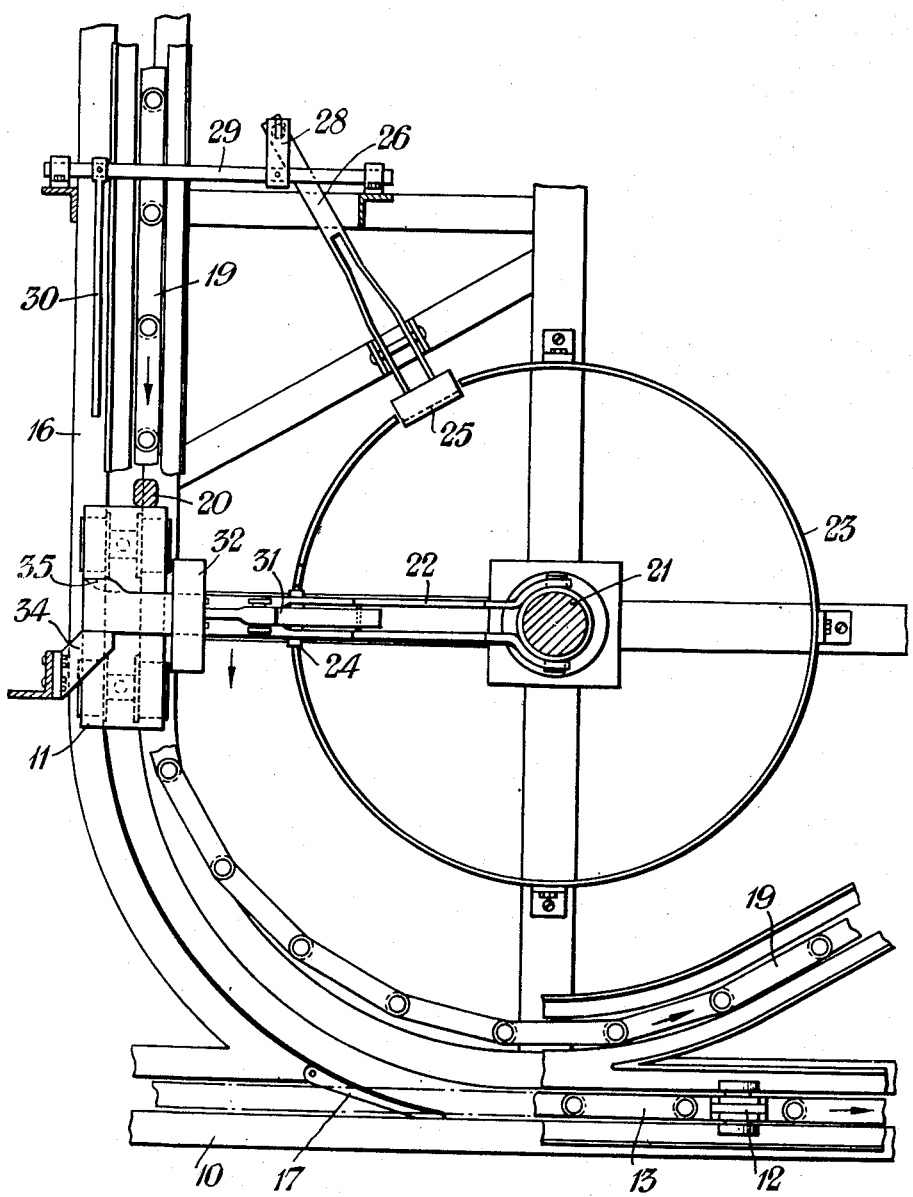
Figure 3:
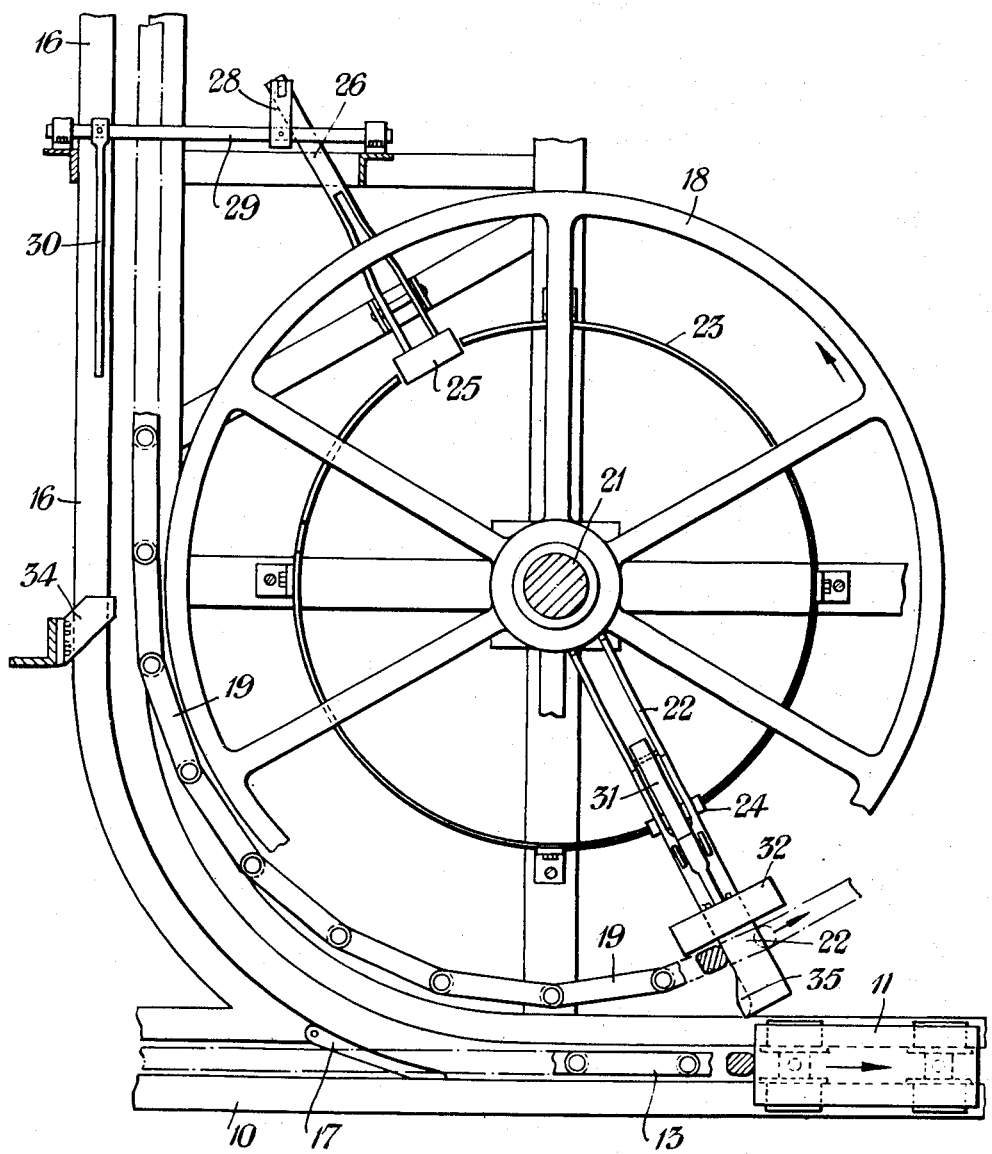

In order that the said invention may be clearly understood and readily carried into effect the same will be hereinafter more fully described with reference to the accompanying drawings in which:

Figures 1, 2 and 3 are plan views of a transfer mechanism showing the operative parts of such mechanism in three different positions taken up during the cycle of operation; and Figure 4 is a side elevational view of the transfer mechanism in the position of Figure 1.

Referring now to the drawings, 10 denotes a main conveyor track hereinafter termed the "main track," along which load carrying trolleys such as are indicated at 11 are adapted to run, said trolleys being propelled by means of pusher dogs or driving abutments 12 carried by a driving chain 13 which is suspended from trolleys 14 adapted to run on a second track 15, hereinafter termed the "chain track," disposed above said main track 10. At a selected point in the main track a branch trolley track 16 is provided. A suitable track switch 17 is located at the confluence of said main and branch tracks so that the trolleys may be transferred from said branch track to the main track. It is the object of the transfer mechanism according to the invention to effect transfer of load carrying trolleys from the branch track 16 to the main track 10. It may be mentioned here that although on the drawings the branch track 16 extends at right-angles to the main track 10 such an arrangement is not necessary since said track 16 may extend at any desired angle to said main track.

Disposed at a convenient point adjacent the junction of the main and branch tracks 10 and 16 is a chain wheel 18 which is rotatable about a vertical axis. The chain wheel is adapted to provide a corner or terminal wheel around which a second driving chain 19 is adapted to pass, said second chain having pusher dogs or driving abutments 20 associated therewith and being so disposed that in its passage to said wheel one run or flight thereof may be caused to travel in a path above the branch track 16 so that load carrying trolleys 11 present on said latter track will be driven therealong towards the main track 10.

Freely mounted on the shaft 21 carrying the chain wheel 18 is an arm 22 which projects radially with respect to the shaft and is of such a length that it will bridge the centres of the chains 13 and 19 both in the branch and main conveyors. In addition to being freely rotatable about the aforesaid shaft 21, the arm 22 is capable of pivotal movement about a horizontal axis, i. e.

is capable of being swung upwardly or downwardly whilst being also rotatable about said shaft. Disposed concentrically with respect to the shaft 21 is a circular track 23 on which a roller 24 mounted on the arm 22 is adapted to run, the roller 24 serving thus to support said arm while allowing free rotational movement thereof. The circular track 23 includes a movable section 25 which is capable of being raised and lowered with respect to the remainder of the track, the arrangement being such that vertical movement of said section will result in a corresponding vertical movement of the arm 22.

The movable section 25 is carried by a pivoted lever 26 which is coupled by means of a link 27 to lever 28 carried by a rod 29 which in turn carries a further lever 30 the lower end of which latter is disposed in the path of the trolleys on the track 16. The arrangement is such that normally the movable section 25 of the circular track 23 will be disposed below the level of said latter track, being adapted on actuation of the lever 30 through the medium of a trolley 11 to be moved up into a position wherein it is in alignment with and forms a part of said circular track.

Pivotally mounted on the arm 22 is a lever 31 carrying a friction pad or the like 32 the arrangement being such that with said arm in its uppermost position (i. e. when the roller 24 associated therewith is running on the circular track 23 and is in rolling contact with the movable section 25 when said section is in its uppermost position) the friction pad 32 will be caused to bear against the undersurface of the chain wheel 18. As indicated above the chain wheel 18 is caused to rotate by virtue of the passage therearound of the second chain 19 to which a drive is imparted in any suitable manner. The arrangement is therefore such that when the friction pad or the like 32 is brought into engagement with said wheel 18 a drive will also be imparted to said arm 22. In order to provide the necessary pressure on the lever to allow of the provision of a satisfactory friction drive, said lever is provided with a suitable counterweight 33.

The mechanism above described is adapted to operate as follows:

Prior to operation the roller 24 associated with the arm 22 will be in engagement with the movable section 25 of the circular track 22 which section is then in its lowermost position as shown in Figs. 1 and 4 so that the arm 22 will correspondingly be in its lowermost position with the result that the friction pad 32 will be out of engagement with the chain wheel 18.

As a load carrying trolley 11 is pushed (by a pusher dog 20 on the second chain 19) along the branch track 16 towards the main track 10, it is adapted as it approaches the junction of the two tracks to operate the lever 30 which is operatively connected to the movable section 25 of the circular track 22 and is adapted on operation to effect raising of said section. Raising of the section 25 in turn causes lifting of the arm 22 and lever 31 and engagement of the friction pad 32 with the chain wheel 18 around which the second driving chain 19 passes. On such engagement of the friction pad the arm 22 will be caused to move about the axis of the chain wheel shaft 21 and will be caused to pass clear over the trolley 11 as the latter is progressed towards the junction of the main and branch tracks. Rotational movement of the arm 22 will continue until it is arrested by a fixed stop 34 at which point the movable section 25 of the circular track is again lowered due to the fact that the trolley has passed out of contact with the lever 30, the movable section 25 thus being ready to receive the arm 22 at the end of the cycle. The arm 22 is lowered by virtue of the profile of the circular track (this is shown in Figure 4) and allows the arm to rest on the top of the trolley. This position is illustrated in Figure 2. Whilst the arm 22 is arrested by the fixed stop 34 the friction pad 32 will slide on the underside of the chain wheel 18. With the arm 22 held stationary and resting upon the top of the trolley which is being driven the position will be reached when the arm 22 will eventually drop and allow the hook portion 35 of the arm to engage the rear of the trolley. The pusher dog 20 which was previously in engagement with said trolley will now engage both the trolley and arm 22. When the arm 22 is in engagement with the rear of the trolley it will clear the fixed stop 34 by which it was previously arrested, the clearance being effected by the arm dropping a distance equal to the height of the hook 35. The pusher dog 20 driven by the second chain 19 will be operative to push the trolley via the track switch 17 into the main track 10 of the main conveyor line. As the second driving chain 19 passes around the chain wheel 18 at the confluence of the branch and main tracks 16 and 10 the pusher dog 20 will be caused to recede from the path of movement of the trolley, but it will continue to impart a drive thereto by virtue of the fact that it is in engagement with the arm 22 which is in turn in engagement with said trolley. As indicated above, the arm 22 is of such a length that it will bridge the centre of the chain 13 of the main conveyor and thus, by virtue of the action of the pusher dog 20 on the second chain 19, it will positively drive the trolley into the main track 10 so that it will be in a position to be engaged by a pusher dog 12 carried by the driving chain 13 of the main conveyor. Due to the fact that the arm 22 rotates about the axis of the chain wheel 18, it will eventually be retracted out of engagement with the trolley as indicated in Figure 3 and be returned to its initial position wherein it will be ready for a further operation.

Preferably the arm 22 is formed with a downturned portion or hook 35 at its outer end adapted to engage over the rear of each trolley, the inner end of the hook section being suitably curved or chamfered to allow of smooth disengagement of the dog and the arm. The track switch 17 at the confluence of the main and branch tracks 10 and 16 may conveniently be operated through the medium of a solenoid, the operation of which latter is controlled in known manner by load trolleys on either the branch or main line tracks. Although on the drawings the centres of the branch chain track 19 and branch trolley track 16 are shown continuing off-set the centres may converge outside the transfer mechanism thus resuming the usual arrangement.

I claim:

1. In a conveyor system including a main track and at least one branch track along which load carrying trolleys are adapted to travel, a switch device whereby such trolleys may be fed from said branch track to the main track and endless driving chains disposed one above each of said branch and main tracks, said driving chains being in spaced, horizontal relation at the confluence of the branch track and main track and carrying depending pusher dogs adapted to engage and to propel the load carrying trolleys along the respective tracks, the provision of a transfer mechanism disposed at the confluence of the branch and main tracks to move the trolleys across the space between the driving chains, such mechanism comprising a transfer arm movable angularly about a vertical axis disposed adjacent the confluence of the tracks, said arm having a normal inoperative lowered position and being raisable about a horizontal axis to an operative position to be moved on said vertical axis, said arm being of such a length as to be capable, when raised to an operative position, of bridging the centres of the driving chains both in the branch and main tracks, and means operable by a trolley in its passage along the branch track towards the junction of the latter with said main track to cause said arm to be raised to an operative position and thereafter move on its vertical axis to push such trolley across the space of the driving chains and into position beneath the driving chain of the main track to thereafter be engaged and propelled by a pusher dog on the driving chain of the branch track.

2. In a conveyor system including a main track and at least one branch track along which load carrying trolleys are adapted to travel, a switch device whereby such trolleys may be fed from said branch track to the main track and endless driving chains disposed one above each of said branch and main tracks, said driving chains being in spaced, horizontal relation at the confluence of the branch track and main track and carrying depending pusher dogs adapted to engage and to propel the load carrying trolleys along the respective tracks, the provision of a transfer mechanism disposed at the confluence of the branch and main tracks to move the trolleys across the space between the driving chains, such mechanism comprising a wheel rotatively supported at the confluence of the tracks and around which the driving chain for the branch track passes, a transfer arm movable angularly about the axis of rotation of said wheel and also mounted for pivotal movement on a horizontal axis, means for coupling said transfer arm to said wheel to move angularly therewith, and means operable by a trolley in its passage along the branch track towards the junction of the latter with said main track, to render said coupling means effective to couple said arm to said wheel and thereby to cause the arm to move angularly into position between the trolley and its motivating pusher dog carried by the driving chain of the branch track, whereafter, due to the action to said driving chain, said arm will be caused to propel the trolley along the branch track and on to the main track until it reaches a point whereat a pusher dog on the driving chain of said main track is itself in position to engage and to propel the same, said coupling means being thereafter effective to restore the arm to its initial position.

3. In a conveyor system including a main track and at least one branch track along which load carrying trolleys are adapted to travel, a switch device whereby such trolleys may be diverted from said branch track to the main track and endless driving chains disposed one above each of said branch and main tracks, said driving chains being in spaced, horizontal relation at the confluence of the branch track and main track and carrying depending pusher dogs adapted to engage and to propel the load carrying trolleys along the respective tracks, the provision of a transfer mechanism disposed at the confluence of the branch and main tracks to move the trolleys across the space between the driving chains, such mechanism comprising a wheel rotatively supported at the confluence of the tracks and around which the driving chain for the branch track passes, a transfer arm movable angularly about the axis of rotation of said wheel and also mounted for pivotal movement on a horizontal axis, friction means mounted on said arm to couple said arm to said wheel to move therewith, means operable by a trolley in its passage along said branch track to the main track to cause the friction means to engage said wheel thereby to cause an angular movement to be imparted to said arm, and a fixed stop disposed in the path of movement of said arm and adapted to hold the latter in a position wherein it will extend across the top of the trolley, the arrangement being such that as a trolley is propelled towards the confluence of said branch and main tracks by a pusher dog on the driving chain of the branch track, it will motivate the arm which will, on being positioned, by the stop and on further movement of the trolley, drop into position behind the trolley and between the trolley and its co-operating pusher dog, whereafter, due to movement of said driving chain, said arm will be caused to propel the trolley along the branch track and on to the main track until it reaches a point whereat a pusher dog on the driving chain of the main track is itself in position to engage and propel the same, said friction means being thereafter effective to restore the arm to its initial position.

4. In a conveyor system including a main track and at least one branch track along which load carrying trolleys are adapted to travel, a switch device whereby such trolleys may be fed from said branch track to the main track and endless driving chains disposed one above each of said branch and main tracks, said driving chains being in spaced, horizontal relation at the confluence of the branch track and main track and carrying depending pusher dogs adapted to engage and to propel the load carrying trolleys along the respective tracks, the provision of a transfer mechanism disposed at the confluence of the branch and main tracks to move the trolleys across the space between the driving chains, such mechanism comprising a wheel rotatively supported at the confluence of the tracks and around which the driving chain for the branch track passes, said wheel being rotatable about a vertical axis disposed adjacent the confluence of the tracks, a transfer arm movable angularly about the axis of rotation of said wheel and also capable of pivotal movement about a horizontal axis, friction means mounted on said arm and adapted, on pivotal movement, of said arm, to engage said wheel and couple said arm thereto, thereby to cause an angular movement to be imparted to said arm, means operable by a trolley in its passage along the branch track to the main track, to effect pivotal movement of said arm, thereby to cause the friction means to engage said wheel and to cause the arm to move angularly, and a fixed stop disposed in the path of movement of said arm and adapted to hold the latter in a position wherein it will extend across the top of the trolley, the arrangement being such that as a trolley is propelled towards the confluence of said branch and main tracks, by a pusher dog on the driving chain of the branch track it will motivate the arm which will, on being positioned by the stop, and on further movement of the trolley, drop into position behind the trolley and between the trolley and its co-operating pusher dog, whereafter, due to movement of said driving chain, said arm will be caused to propel the trolley along the branch track and on to the main track until it reaches a point whereat a pusher dog on the driving chain of the main track is itself in position to engage and propel the same, said friction means being thereafter effective to restore the arm to its initial position.

5. In a conveyor system including a main track and at least one branch track along which load carrying trolleys are adapted to travel, a switch device whereby such trolleys may be fed from said branch track to the main track and endless driving chains disposed one above each of said branch and main tracks, said driving chains being in spaced, horizontal relation at the confluence of the branch track and main track and carrying depending pusher dogs adapted to engage and to propel the load carrying trolleys along the respective tracks, the provision of a transfer mechanism disposed at the confluence of the branch and main tracks to move the trolleys across the space between the driving chains, such mechanism comprising a wheel rotatively supported at the confluence of the tracks and around which the driving chain of the branch track passes, said wheel being adapted to rotate about a vertical axis disposed adjacent the confluence of the tracks, a transfer arm movable angularly about the axis of rotation of said wheel and also capable of pivotal movement about a horizontal axis, a follower mounted on said arm, a circular track concentric with said wheel and about which said follower moves, a movable section incorporated in said circular track and adapted normally to assume a depressed position in relation thereto, said follower being normally in engagement with said movable section of the track, friction means also mounted on said arm and adapted on pivotal movement of the latter to engage the wheel, thereby to cause an angular movement to be imparted to said arm, and means adapted to be actuated by a trolley in its passage along the branch track to the main track to raise said movable section of the circular track, thereby to effect pivotal movement of the arm sufficient to cause the friction means to engage said wheel and to cause the arm to move angularly with the latter into a position wherein it will engage with the trolley while also lying in the path of a pusher dog in the driving chain of the branch track, whereafter, due to the action of said latter driving chain, said arm will be caused to propel the trolley along the branch track and on to the main track until it reaches a point whereat a pusher dog on the driving chain of said main track is itself in position to engage and propel the same, said friction means being thereafter effective to restore the arm to its initial position.

6. A transfer mechanism as in claim 5, in which the means include a pivoted lever disposed in the path of any trolley passing along the branch track, and a linkage mechanism coupling said lever to the movable section of the circular track, the construction being such that on passage of a trolley, the section will be operated to initiate movement of the transfer arm, said section returning to its initial position when the trolley moves out of contact with the lever.

7. A transfer mechanism as in claim 5, in which the friction means comprise a lever pivotally mounted on the arm, a friction pad carried by said lever, and means mounted on the lever adapted to counterweight the friction pad in order to ensure the requisite frictional engagement between the latter and the corner wheel.

8. A transfer mechanism as in claim 5, wherein the arm is formed at its outer or free end with a portion so shaped as to engage over the rear end of the trolley.

References Cited in the file of this patent
UNITED STATES PATENTS

| Number | Name | Date |
| --- | --- | --- |
| 2,527,244 | Culver | Oct. 24, 1950 |